Sept. 16, 1952   M. P. ROKOS   2,610,519
BACKLASH TAKE-UP DEVICE
Filed Sept. 8, 1951
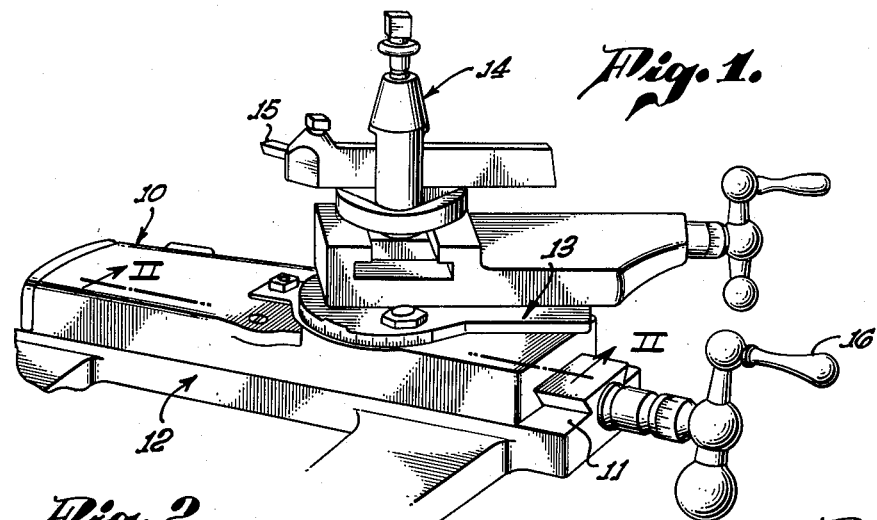
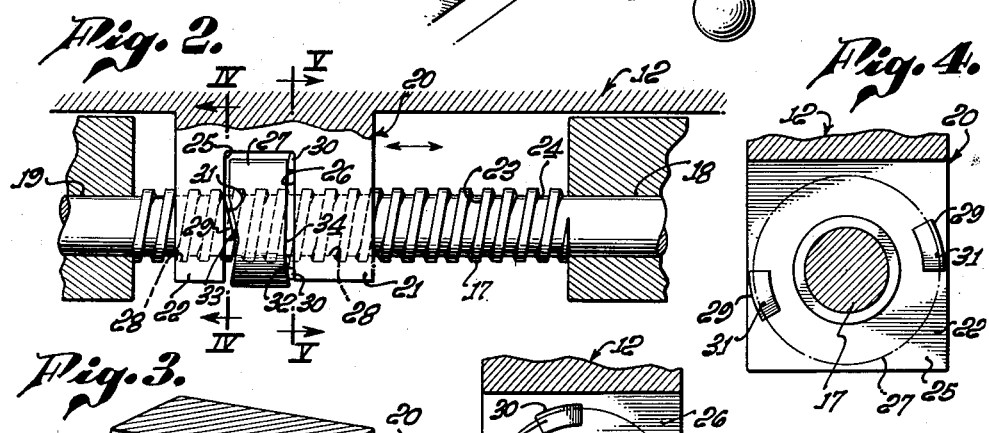
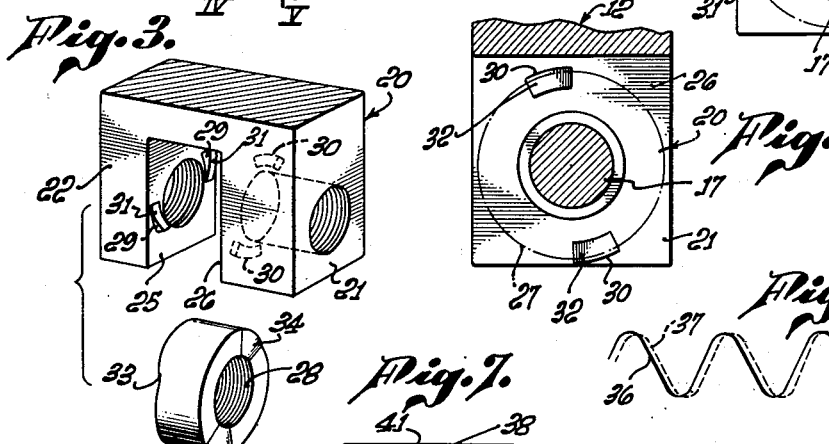
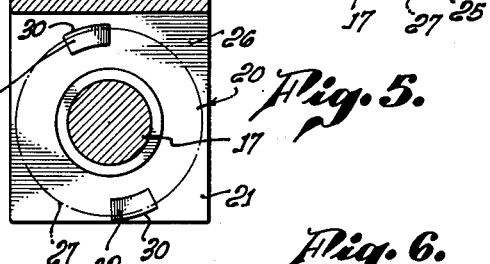
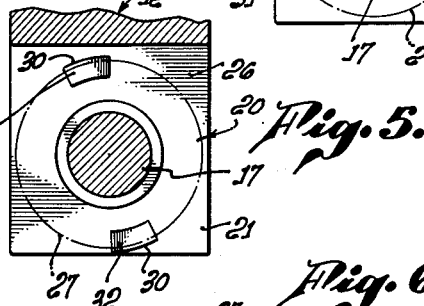
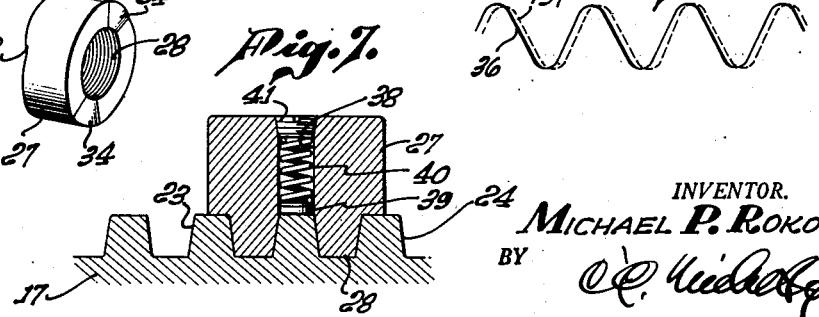
INVENTOR.
MICHAEL P. ROKOS,
BY
ATTORNEY.

Patented Sept. 16, 1952

2,610,519

UNITED STATES PATENT OFFICE 2,610,519

BACKLASH TAKE-UP DEVICE

Michael P. Rokos, Oakview, Calif., assignor of one-half to Ted G. Rokos, Los Angeles, Calif.

Application September 8, 1951, Serial No. 245,745

7 Claims. (Cl. 74—441)

This invention relates to a positive feed attachment for machinery such as lathes and the like. In particular, the invention is concerned with accurate, positive, and immediate positioning of a cutting tool with respect to a work piece and the prevention of end play or axial play of said tool after it has been positioned.

In a lathe, for example, a feed screw on a cross slide carriage may be provided with one or more lock nuts and carries a tool-holding slide member for adjustably and selectively positioning a tool supported by the member with respect to the metal to be worked. In order to selectively position the cutting tool it is, in some prior proposed arrangements, necessary to advance the cutting tool slightly beyond its ultimate desired cutting position and then to retract the tool so as to take up any play or slack between the tool slide member and the feed screw. After it has been retracted to ultimate position the tool slide member is usually locked in a position on the feed screw by means of one or more lock nuts or other suitable means. It is well understood by those skilled in the art that the accurate positioning of such a cutting tool requires not only familiarity with a particular machine but also a high degree of skill in accurately and quickly adjusting the cutting tool into its final ultimate cutting position. If this adjustment is not proper and end play in the feeding mechanism is not eliminated, the tool may chatter when brought into cutting engagement with a work piece and the metal may be inaccurately cut to an undesired size. Since very small differences may be critical, it is possible to irreparably damage a metal piece being worked upon by the presence of a slight amount of end play in the feeding mechanism. Such a high degree of accuracy required in the ultimate positioning of the cutting tool usually necessitates spending considerable time in accurately positioning the tool.

It is therefore an object of this invention to provide a positive feed attachment which is adapted for use on various types of machinery, such as a lathe, whereby a cutting tool may be quickly ultimately positioned without end play in the feed mechanism.

Another object of this invention is to provide means for preventing end play between a feed nut means and a feed screw, wherein said feed nut means and screw are cooperable to accurately position a cutting tool with respect to a work piece.

A further object of this invention is to design and provide a positive feed attachment for automatically preventing axial play between a feed screw and a feed nut means wherein a movable nut carried by said screw is movable out of phase relationship with the feed screw against a feed nut so as to eliminate axial play between the feed screw and the feed nut.

A further object of this invention is to provide a positive feed attachment for machinery wherein a movable nut is operable between a pair of feed nuts fixed with respect to a tool-holding means and carried by a feed screw wherein at least one end face of the movable nut is cooperable with an opposed end face of one of the fixed nuts for prevention of end play.

This invention contemplates a positive automatic feed attachment wherein sides of a movable nut and opposed end faces of a pair of spaced fixed nuts are provided with cooperative elements for selective engagement to prevent end play in the feed attachment.

Still another object of this invention is to provide a movable nut such as described above which is afforded biased frictional means for engagement with a feed screw.

Generally speaking this invention contemplates a means for automatically preventing end play or axial play between a feed screw and a feed nut means as provided in the feeding mechanism on a cross slide carriage of a lathe. A pair of spaced fixed feed nuts threadedly carried by a rotatable feed screw are provided with opposed inner faces. A movable nut is threaded on the feed screw between said inner faces; each side of the movable nut being normally spaced from an opposed inner face of the fixed nuts whereby the movable nut may be rotated, as the feed screw is turned, to move axially toward either one or the other of the feed nuts depending upon the direction of rotation of the screw. The opposed sides of the movable nut and the faces of the fixed feed nuts carry pairs of cooperative elements for limiting axial movement of the movable nut against a feed nut in a position with the threads of the movable nut in out-of-phase relationship with the threads of the adjacent feed nut a distance of between 0.03 and 0.09 of the pitch of said threads. Thus rotation of the feed screw may advance and stop a tool-holding slide member with end play between the feed nut means and the feed screw automatically prevented because of the engagement of the cooperative elements of the movable nut with one of the fixed nuts.

Other objects and advantages of this invention will be readily apparent from the following description of the drawings.

In the drawings:

Fig. 1 is a perspective view of a cross slide carriage for lathe embodying this invention.

Fig. 2 is an enlarged fragmentary sectional view taken in a vertical plane indicated by line II—II of Fig. 1.

Fig. 3 is an enlarged exploded perspective view of the position feed attachment illustrated in Fig. 2.

Fig. 4 is a sectional view taken in the plane indicated by line IV—IV of Fig. 2.

Fig. 5 is a transverse sectional view taken in the plane indicated by line V—V of Fig. 2.

Fig. 6 is a diagrammatic view showing a phase relationship between the threads of the fixed feed nuts and the movable nut.

Fig. 7 is an enlarged fragmentary sectional view of the movable nut taken in a plane passing through the axis of the feed screw shown in Fig. 2.

In Fig. 1, a cross slide carriage generally indicated at 10 is of well-known type for exemplifying the employment of this invention on a lathe. The carriage 10 provides a bed 11 for a tool slide member 12, said tool slide member 12 carrying a swivel support generally indicated at 13 for a tool holder generally indicated at 14. The tool holder 14 may carry a cutting tool 15. The specific details of the cross slide carriage, swivel support, and tool holder have not been shown because they are well-known in the art and do not form a part of this invention. The tool slide 12 may be moved longitudinally of carriage 10 upon bed 11 by rotating a feed handle 16 which may be connected to a feed screw 17 in usual manner.

The feed screw 17 may be journaled at opposite ends in carriage 10 as illustrated in Fig. 2 at 18 and 19. The tool slide member 12 may be provided with a feed nut means 20 which may depend downwardly from the slide within an elongated opening in the carriage for threaded cooperation with feed screw 17 so that as handle 16 is turned, the threaded engagement between feed screw 17 and feed nut means 20 will advance or retract the tool slide member 12. While the feed nut means is illustrated as being integral with the tool slide member, it is understood that the feed nut means may be attached to the tool slide member in any suitable manner.

The feed nut means 20 comprises a pair of spaced feed nuts 21 and 22, each nut 21 and 22 having threaded engagement with the feed screw 17. The threads of the feed screw 17 may be of square or acme type, each thread having a front face 23 and a rear face 24. The feed nuts 21 and 22 have opposed parallel faces 25 and 26 lying in planes transverse to the axis of the feed screw.

Between the faces 25 and 26 of feed nuts 22 and 21 respectively, there is provided a movable nut 27 having internal threads 28 of the same pitch as the threads of feed nuts 21 and 22. Preferably, although not necessarily, the feed nut means may be formed by drilling and threading a bore through a solid block of metal. After threading, an inner section may be cut out of the block so as to form the two spaced connected feed nuts 21 and 22. The movable nut 27 may be formed from the cut-out section and provided with a circular peripheral edge permitting rotation of the nut on the feed screw 17 between the feed nuts 21 and 22.

Each face 25 and 26 is provided with a pair of diametrically opposed wedge elements 29 and 30 respectively, said wedge elements having arcuate inclined pairs of wedge faces 31 and 32 respectively. Each pair of wedge faces 31 and 32 are inclined in a direction opposite to the pitch of the thread of the feed screw. It should be noted that elements 29 are disposed in angular relationship to the elements 30, in the example shown approximately 90°.

On opposite sides the movable nut 27 is provided with inclined arcuate diametrically opposite pairs of wedge faces 33 and 34, the pair of wedge faces 33 being on the side of the nut 27 facing wedge elements 29, and the wedge faces 34 being on the side of the nut facing the wedge elements 30. The pairs of wedge faces 33 and 34 are likewise disposed in angular relationship to each other, in the example shown, of approximately 90°, so as to cooperate with the respective faces 31 and 32 on the feed nuts.

The pairs of wedge faces 33 and 34 on movable nut 27 may be formed on said nut at an intermediate point between the elements 29 and 30 when the nut is in phase relationship with the threads of feed screw 17; that is when the nut is in the original position of the cut-out section when the block was initially threaded.

In operation, when the tool slide handle 16 is rotated clockwise so as to move the tool slide forwardly or into the machine, the feed screw will cause the feed nut means to advance to the left as viewed in Fig. 2. As the feed nuts begin to advance along the threads, the movable nut is rotated clockwise by reason of its frictional contact with the threads of the feed screw. Such rotation of the movable nut 27 brings the wedge faces 34 on the nut 27 into wedge engagement with the wedge faces 32 of elements 30 provided on the face 26 of the feed nut 21 and axial movement of the nut 27 is stopped. Such wedge engagement forces the movable nut 27 out of phase relationship with the threads of the feed screw 17 so that end play or relative axial movement between the feed nut means and the feed screw 17 is eliminated. Thus, the tool slide member 12 is advanced and held without any slack being present in the threaded attachment of the tool slide with the feed screw 17.

Such out-of-phase relationship is diagrammatically indicated in Fig. 6 wherein the solid line 36 represents the path of the thread of the feed screw 17. Normally, when a nut is in phase relationship with such a path 36, the path of its thread lies coincident with line 36, clearance being provided between the threads of the screw and nut. When the movable nut 27 is rotated by the feed screw against a feed nut, the path of the threads of the movable nut move out of phase relationship with the threads of the feed nuts and are held out of phase by the pairs of cooperative elements 29, 30 and the wedge faces 33, 34. The path of the threads of the movable nut is represented by the dotted line 37. Axial play is eliminated because the clearance between the threads of the screw and the feed nuts in a longitudinal direction has been virtually eliminated. Stopping axial movement of the movable nut toward the adjacent feed nut by the cooperative elements on the feed nuts and movable nut positions the threads of the movable nut out of phase with the threads of the feed nuts by a distance of between about 0.03 and 0.09 of the pitch of said threads.

In order that the movable nut 27 may positively move or turn with the rotation of the feed screw 17, in Fig. 7 I have illustrated a frictional means for affording such positive movement. The nut 27 may be provided with a radial bore 38 which opens into the root of the internal teeth of the nut 27. Within the bore 38 may be provided a cup-shaped cap 39 of any suitable frictional material such as a composition fiber; a spring 40 having one end seated on said cap and the other end seated on a set screw 41. The set screw 41 may be adjusted so that the spring 40 is compressed to any desired degree for preselected frictional engagement of cap 39 with the crest of the threads of the feed screw 17.

It will be understood, of course, that the cooperative engagement of the movable nut and the feed nuts will provide a positive feed without the use of the auxiliary frictional means of Fig. 7. Friction between the threads of the movable nut and screw is usually sufficient to cause the movable nut to turn so as to move against a feed nut.

The cooperative wedge elements and wedge faces on the feed nuts and movable nuts respectively acting along inclined surfaces directed oppositely to the direction of advancement of the threads of the feed screw quickly and positively move the threads of the movable nut out of phase with the threads of the feed nuts and hold them out of phase. Release or return of the movable nut to in-phase relation is also quickly accomplished when the feed handle is rotated counterclockwise. As the handle is further rotated, the cooperative elements on the other side of the movable nut and adjacent feed nut coact to again move the movable nut out of phase with the feed nut and end play is eliminated.

Those skilled in the art will note that a tool slide member may thus be accurately, positively, and quickly moved to a preselected position and that any end play or relative axial movement between the feed nut means and the feed screw has been automatically eliminated.

All changes and modifications of the positive feed attachment described above coming within the scope of the appended claims are embraced thereby.

I claim:

1. Means for automatically preventing end play between a feed screw and a feed nut comprising: a rotatable feed screw restrained from axial movement and provided with threads having a forward face and a rear face; a pair of spaced feed nuts, each provided with an internally threaded bore, said bores being in alignment and arranged to threadedly receive the rotatable feed screw, each of said feed nuts having an end wall in spaced, opposed and unchanging relation to the end wall of the other feed unit; a movable nut rotatably and threadedly carried by the feed screw between said feed nuts, the ends of said movable nut being normally spaced from the opposing end walls of the feed nuts whereby said movable nut may be rotated to move axially toward either of the feed nuts; means carried by the movable nut to frictionally grasp the feed screw; and cooperative elements carried by the ends of the movable nut and the opposing end wall of the adjacent feed nut for stopping axial movement of the movable nut toward such adjacent feed nut with the threads of the movable nut out of phase with the threads of said adjacent feed nut a distance of between about 0.03 and 0.09 of the pitch of such threads.

2. A device of the character stated in claim 1 wherein the cooperative elements include faces inclined in a direction opposite to the pitch of said feed screw.

3. Means for automatically preventing end play between a feed screw and a feed nut comprising: a rotatable feed screw restrained from axial movement and provided with threads having a forward face and a rear face; a pair of spaced feed nuts, each provided with an internally threaded bore, said bores being in alignment and arranged to threadedly receive the rotatable feed screw; each of said feed nuts having an end wall in spaced, opposed and unchanging relation to the end wall of the other feed nut; a movable nut rotatably and threadedly carried by the feed screw between said feed nuts, the ends of said movable nut being normally spaced from the opposing end walls of the feed nuts whereby said movable nut may be rotated to move axially toward either of the feed nuts; and cooperative elements carried by the ends of the movable nut and the opposing end wall of the adjacent feed nut for stopping axial movement of the movable nut toward such adjacent feed nut with the threads of the movable nut out of phase with the threads of said adjacent feed nut a distance of between about 0.03 and 0.09 of the pitch of such threads.

4. Means for automatically preventing end play between a feed screw and a feed nut comprising: a rotatable feed screw; a pair of spaced feed nuts, each provided with an internally threaded bore, said bores being in alignment and arranged to threadedly receive the rotatable feed screw, each of said feed nuts having an end wall in spaced, opposed and unchanging relation to the end wall of the other feed nut; a movable nut rotatably and threadedly carried by the feed screw between said feed nuts, the ends of said movable nut being normally spaced from the opposing end walls of the feed nuts whereby said movable nut may be rotated to move axially toward either of the feed nuts; and cooperative elements carried by the ends of the movable nut and the opposing end wall of the adjacent feed nut for stopping axial movement of the movable nut toward such adjacent feed nut with the threads of the movable nut out of phase with the threads of said adjacent feed nut a distance of between about 0.03 and 0.09 of the pitch of such threads.

5. Means for automatically preventing end play between a feed screw and a feed nut comprising: a rotatable feed screw; a pair of spaced feed nuts, each provided with an internally threaded bore, said bores being in alignment and arranged to threadedly receive the rotatable feed screw, each of said feed nuts having an end wall in spaced, opposed and unchanging relation to the end wall of the other feed nut; a movable nut rotatably and threadedly carried by the feed screw between said feed nuts, the ends of said movable nut being normally spaced from the opposing end walls of the feed nuts whereby said movable nut may be rotated to move axially toward either of the feed nuts; and cooperative elements carried by the ends of the movable nut and the opposing end wall of the adjacent feed nut for stopping axial movement of the movable nut toward such adjacent feed nut.

6. A device of the character stated in claim 5 wherein the cooperative elements on the movable nut and the adjacent feed nut are respectively diametrically arranged and are normally angularly displaced when the movable nut and feed nut are in phase relationship.

7. Means for automatically preventing end play between a feed screw and a feed nut comprising: a rotatable feed screw; a pair of spaced feed nuts, each provided with an internally threaded bore, said bores being in alignment and arranged to threadedly receive the rotatable feed screw, each of said feed nuts having an end wall in spaced, opposed and unchanging relation to the end wall of the other feed nut; a movable nut rotatably and threadedly carried by the feed screw between said feed nuts, the ends of said movable nut being normally spaced from the opposing end walls of the feed nuts whereby said movable nut may be rotated to move axially toward either of the feed nuts; and cooperative inclined faces carried by the ends of the movable nut and the opposing end wall of the adjacent feed nut for stopping axial movement of the movable nut toward such adjacent feed nut.

MICHAEL P. ROKOS.

No references cited.